United States Patent
Karlbauer et al.

(10) Patent No.: US 6,394,488 B2
(45) Date of Patent: May 28, 2002

(54) AIRBAG APPARATUS

(75) Inventors: Ulrich Karlbauer; Heinrich Einsiedel, both of Ulm; Thomas Reichenbecher, Neu-Ulm, all of (DE)

(73) Assignee: Takata (Europe) Vehicle Safety Technology GmbH, Ulm (DE)

(*) Notice: Subject to any disclaimer, the term of this patent is extended or adjusted under 35 U.S.C. 154(b) by 0 days.

(21) Appl. No.: 09/769,300

(22) Filed: Jan. 26, 2001

(30) Foreign Application Priority Data

Jan. 26, 2000 (DE) .......................................... 100 03 279

(51) Int. Cl.⁷ .............................................. B60R 21/26
(52) U.S. Cl. ..................................... 280/730.2; 280/742
(58) Field of Search .............................. 280/730.2, 736, 280/741, 740, 742

(56) References Cited

U.S. PATENT DOCUMENTS 5,788,270 A * 8/1998 Haland et al.
6,164,688 A 12/2000 Einsiedel et al. ........ 280/730.2
6,217,060 B1 * 4/2001 Mangold et al.

FOREIGN PATENT DOCUMENTS

| DE | 29813636 U1 | 11/1998 |
| DE | 19738741 A1 | 3/1999 |
| DE | 19812915 A1 | 9/1999 |

* cited by examiner

*Primary Examiner*—Paul N. Dickson
(74) *Attorney, Agent, or Firm*—Foley & Lardner

(57) ABSTRACT

The invention relates to an airbag apparatus for motor vehicles, in particular to a side airbag apparatus comprising a gas generator and a gas filling tube. The tube is provided along its length at predetermined distances gas overflow openings. The openings are connected to an inflatable gas bag which extends at least over a greater portion of the length of the tube and preferably consists of individual cells. Each cell is associated with a pair of gas outflow openings. The gas outflow openings are formed by incisions in the wall of the gas filling tube and by indentations of the tube wall material on one side of the incisions and extending at an angle to the tube axis.

13 Claims, 3 Drawing Sheets

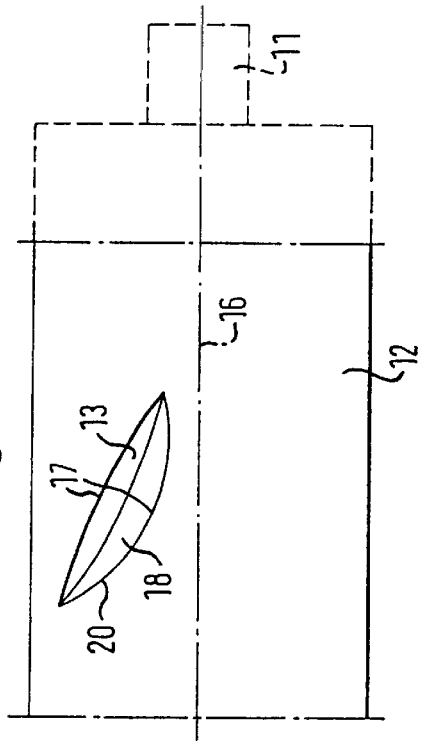
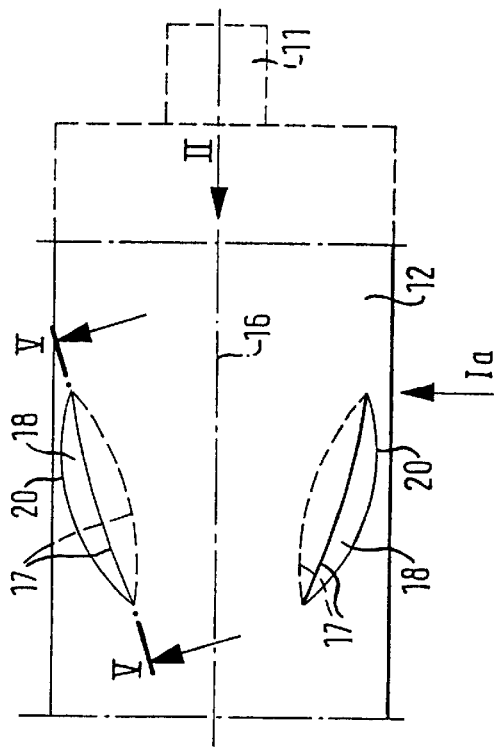
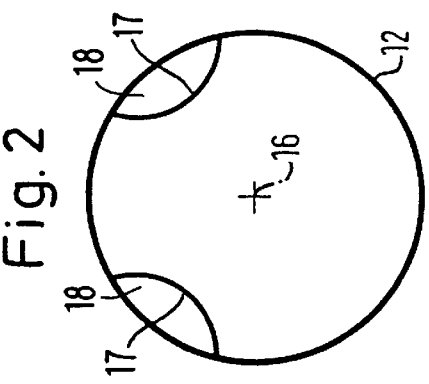

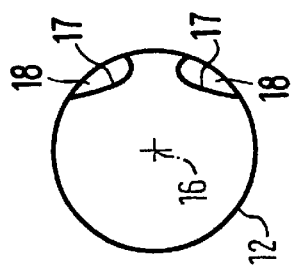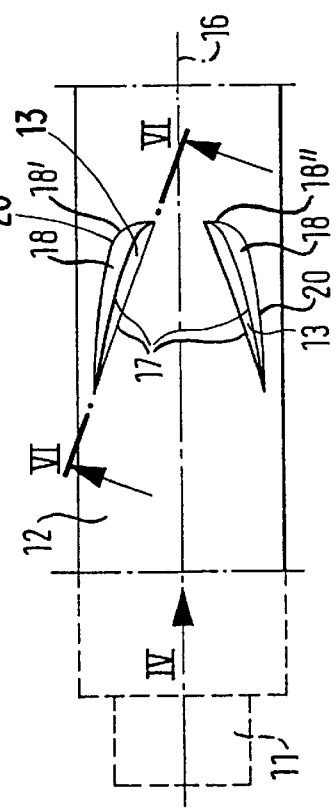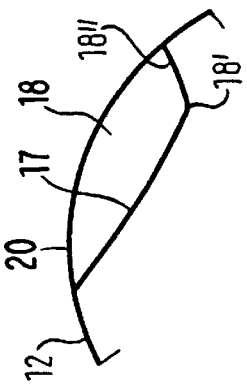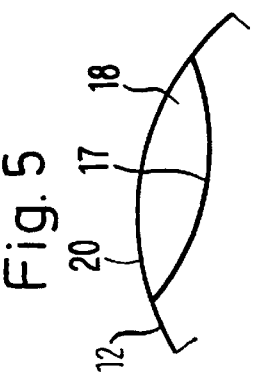

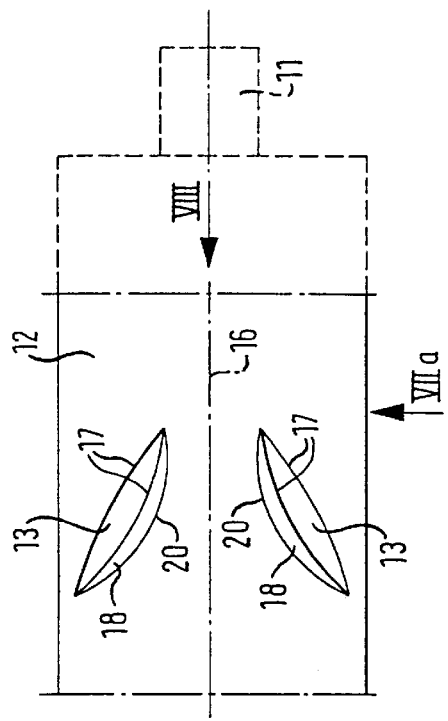
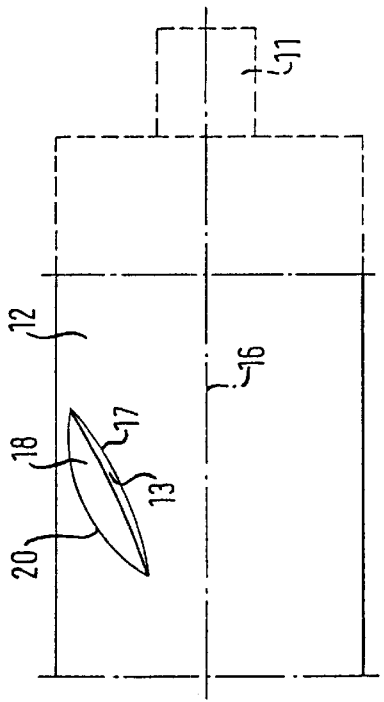
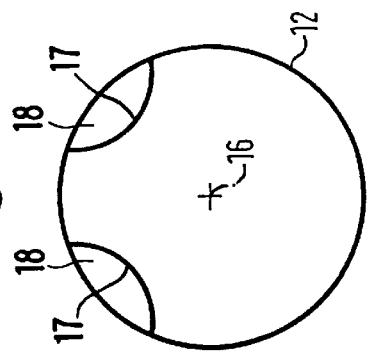

AIRBAG APPARATUS

BACKGROUND

The invention relates to an airbag apparatus for motor vehicles. In particular, the invention relates to a side air bag.

An airbag apparatus of this kind is known from EP 0 945 313, the contents of which are also included in the present application by reference.

SUMMARY OF THE INVENTION

The object of the present invention consists in creating an airbag apparatus of the initially named kind which ensures particularly favorable gas outflow relationships with good stability of the gas filling tube in the region of the gas outflow openings.

Through these angle ranges, on the one hand an excellent stability of the gas filling tube in the region of the gas outflow openings and on the other hand a good gas outflow behavior are achieved.

By the solution in accordance with the present invention the gas outflow conditions are further significantly improved without impairing the stability of the gas filling tube.

Finally, by the solution in accordance with the present invention a gas flow direction which is particularly favorable for certain applications is achieved without the stability of the gas filling tube in the region of the gas outflow openings being impaired.

BRIEF DESCRIPTION OF THE DRAWINGS

The invention will be described in the following in more detail in an exemplary manner with reference to the drawings; shown in these are:

FIG. 1 a top view of a first embodiment of a section of a gas filling tube of an airbag apparatus in accordance with the invention having two indentations formed therein, the far side of the indentations being shown in broken lines, FIG. 1a a side view in the direction of the arrow Ia in FIG. 1, FIG. 2 an end view of the object in FIG. 1 in the direction of arrow II in FIG. 1, FIG. 3 a top view of a second embodiment of a section of a gas filling tube of an airbag apparatus in accordance with the invention having two indentations formed therein, FIG. 4 an end view of the object in FIG. 3 in the direction of the arrow IV in FIG. 3, FIG. 5 a somewhat enlarged sectional view in accordance with the line V—V in FIG. 1, FIG. 6 a somewhat enlarged sectional view in accordance with the line VI—VI in FIG. 3, FIG. 7 a top view of a further embodiment of a section of a gas filling tube of an airbag apparatus in accordance with the invention having two indentations formed therein, FIG. 7a a side view in accordance with line VIIa in FIG. 7, FIG. 8 an end view in accordance with the line VIII in FIG. 7.

DESCRIPTION

Of the airbag apparatus in the drawings, in each case only the gas filling tube 12 is shown and the gas generator 11 is indicated. The arrangement of the constructional elements cooperating therewith, in particular of the gas bag which is inflatable through the gas outflow openings, is found in EP 0 945 313.

In accordance with FIGS. 1 and 2 two incisions 17 which are produced by a planar tool such as a saw and which in each case have an angle on the order of magnitude of +20° and −20° respectively relative to the tube axis 16 are provided in the wall of the gas filling tube 12 at a small distance in the peripheral direction. The region between the incisions 17 widens in the direction of that end of the gas filling tube 12 at which the gas generator 11, which is only indicated in broken lines, is arranged. Along the length of the gas filling tube 12, as many such pairs of incisions 17 are provided at a suitable distance as are required for inflating the gas bag or its cells respectively.

At the sides of the incisions 17 of each pair which face away from one another, indentations 18 are provided through a deep-draw-like deformation process, the boundary of which to the undeformed tube material is designated by 20 and of which the depth in accordance with FIG. 5 continuously increases starting from the incision ends to reach a maximum in the middle. In this way, gas outflow openings 13 are created, through which the pressure gas which is sent into the gas filling tube 12 when the gas generator 11 is ignited can flow in into the gas bag or its cells respectively.

Through the limited oblique position of the incisions 17 relative to the tube axis 16, on the one hand a relatively wide undeformed region between the adjacent incisions 17 even at their ends, which are most closely adjacent, and thereby a good tube stability is ensured and on the other hand a gas outflow amount is ensured which is matched to the requirements.

The exemplary embodiment in accordance with FIGS. 3, 4 and 6 differs from that in accordance with FIGS. 1, 2 and 5 in that the maximum 18' of the indentations 18 is significantly displaced relative to the middle of the incisions 17 in the direction of the end of the incisions 17 which faces away from the gas generator 11 in such a manner that relatively steep flanks 18" are formed there at which the gas which flows in the gas filling tube 12 when the gas generator 11 is ignited is deflected outwardly by a relatively large angle to the tube axis 16 into the gas bag or its cells respectively. Although these steep flanks 18" are important for the ideal gas deflection precisely for relatively small angles of the incisions 17 relative to the tube axis 16, they can also be used to advantage at greater angles above 30°.

FIGS. 7, 7a and 8 show that the indentations 18 at adjacent incisions 17 which are arranged at an angle to the tube axis 16 can also be provided at the sides of the incisions 17 which point towards one another. In this the incisions 17 must however be oppositely angularly inclined relative to the tube axis 16 as in the preceding exemplary embodiments; i.e. the incisions 17 need not diverge, but rather must converge, in the direction of the gas generator 11.

This construction and arrangement has the advantage that the two gas flows 14, 15 which emerge from adjacent gas outflow openings 13 do not enclose too great an angle with one another, thus on the whole have the same direction, which is expedient in certain uses.

In order to expedite the gas deflection, steep flanks similar to those at 18" in FIGS. 3, 6 can also be provided in this embodiment in the end region of the indentations 18 which faces away from the gas generator 11.

What is claimed is:

1. Airbag apparatus for motor vehicles comprising:
   a gas generator and a gas filling tube which is connected thereto, the filling tube being provided along its length, at predetermined distances, with pairs of gas outflow openings, wherein the filling tube is connected to an inflatable gas bag which includes individual cells, wherein each of the cells is associated with a pair of the gas outflow openings, and wherein the gas outflow openings are formed by incisions in the wall of the gas filling tube; and indentations in the tube wall on one side of the incisions and extending at an angle to the tube axis, each indentation corresponding to one of the incisions, wherein each of the incisions provided at a small distance transversely to the tube axis, wherein for each pair of incisions forming each of the pairs of outflow openings, the indentations lie on the sides of the incisions which face away from one another, and wherein the tube between the gas outflow openings is undeformed, wherein the incisions have an angle of more than 0° to less than 30° relative to the tube axis, and wherein the gas generator is arranged at an end of the gas filling tube in the direction towards which the limbs of the angle between the incisions diverge.

2. Airbag apparatus in accordance with claim 1, wherein the diameter of the gas filling tube lies between 12 mm and 22 mm.

3. Airbag apparatus in accordance with claim 1, wherein the length of the incisions lies between 2 mm and 6 mm.

4. Airbag apparatus in accordance with claim 1, wherein the length of the incisions lies between 6 mm and 15 mm.

5. Airbag apparatus for motor vehicles comprising:

a gas generator and a gas filling tube which is connected thereto, wherein the gas filling tube is provided along its length, at predetermined distances, with gas outflow openings, wherein the gas filling tube is connected to an inflatable gas bag which includes individual cells, wherein each of cells is associated with a pair of the gas outflow openings wherein the gas outflow opening are formed by incisions in the wall of the gas filling tube;

indentations, corresponding to the incisions, in the tube wall on one side of the incisions and extending at an angle to the tube axis, wherein the indentations are on the sides of the incisions which face away from the gas generator, wherein the incisions forming each of the pairs of outflow openings are provided at a small distance transversely to the tube axis, wherein the indentations lie on the sides of a pair of incisions which face away from one another, and wherein the tube between the gas outflow openings is underformed, wherein the gas generator is arranged at an end region of the gas filling tube in the direction towards which the limbs of the angle between each incision and the tube axis diverge, and wherein a peak of the indentations is displaced relative to the middle of the incisions in the direction away from the gas generator so that the indentations have a steep flank at the end of the indentations away from the gas generator.

6. Airbag apparatus in accordance with claim 2, wherein the steep flank extends over 10% to 30% of the length of the associated incision.

7. Airbag apparatus for motor vehicles comprising:

a gas generator and a gas filling tube which is connected thereto, wherein the gas filling tube is provided along its length, at predetermined distances, with gas outflow openings, wherein the gas filling tube is connected to an inflatable gas bag which includes individual cells, wherein each of the cells is associated with a pair of gas outflow openings which are formed by incisions; and indentations, corresponding to the incisions, in the tube wall on one side of the incisions and extending at an angle to the tube axis, wherein the indentations are on the sides of the incisions which face away from the gas generator, wherein the incisions in each pair of incisions face away from the gas generator, wherein the two incisions forming each of the pairs of outflow openings are provided at a small distance transversely to the tube axis, and wherein the tube is undeformed between the boundary lines of the indentations, wherein the gas generator is arranged at an end region of the gas filling tube in the direction towards which the limbs of the angle between each incision and the tube axis converge, and wherein the two indentations of a pair of incisions lie on the mutually facing sides of the incisions.

8. Airbag apparatus in accordance with claim 7, wherein a peak of the indentations is displaced relative to the middle of the incisions in the direction away from the gas generator so that the indentations have a steep flank at the end of the indentations away from the gas generator.

9. Airbag apparatus in accordance with claim 8, wherein the steep flank extends over 10% to 30% of the length of the associated incision.

10. Airbag apparatus in accordance with claim 7, wherein the angle of the incisions relative to the tube axis is less than 45°.

11. An airbag apparatus for motor vehicles comprising:

a gas generator;

a gas filling tube connected to the gas generator;

a plurality of gas outflow openings in the tube positioned in pairs along the length of the tube;

an inflatable airbag positioned to receive gas from the openings; and wherein each opening in the tube is formed by making an incision in the tube at an angle of less than 30° from the tube axis and making an indentation in the tube on one side of the incision, and wherein each indentation includes a steep flank that forms an angle greater than 30° with respect to one end of the incision.

12. The apparatus of claim 11, wherein the gas generator is positioned at the end of the tube opposite to an end pointed to by the angle formed by the incision and the tube axis.

13. The apparatus of claim 12, wherein each indentation is positioned in the tube on the side of the incision farthest from the gas generator.

* * * * *